D. F. STAMBAUGH.
BED BOTTOM.
No. 10,749. Reissued July 27, 1886.
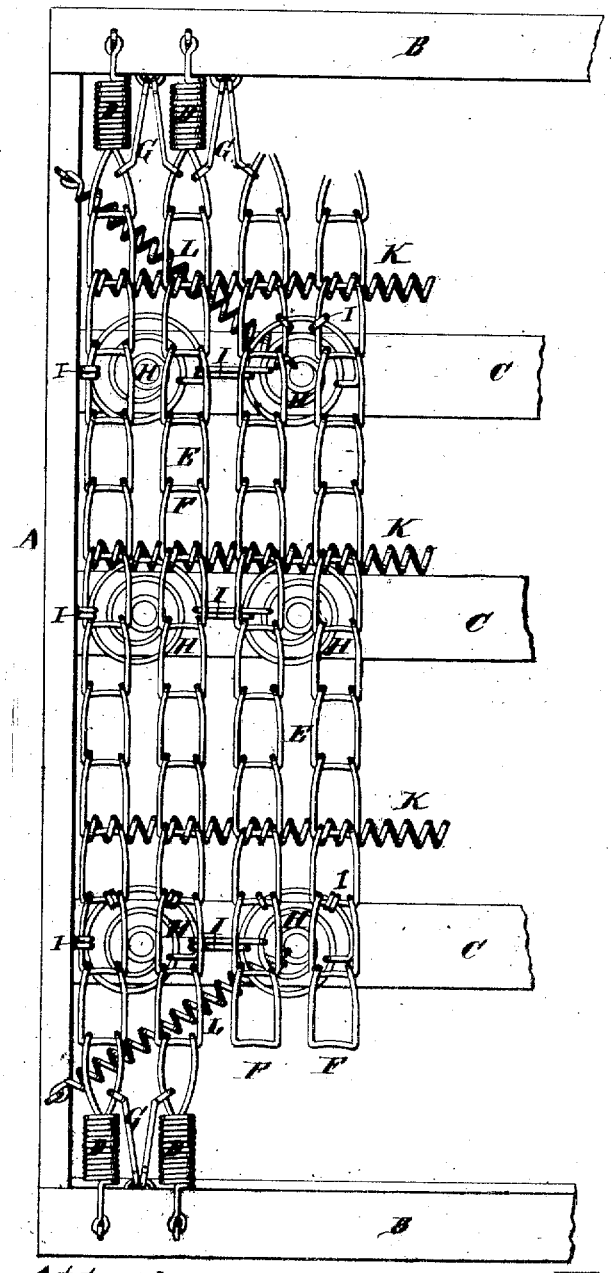
Attest:
F. A. Hopkins.
L. W. Hopkins
Inventor:
David F. Stambaugh
By Knight Bros.
Attys.

BEST AVAILABLE COPY

UNITED STATES PATENT OFFICE.

DAVID F. STAMBAUGH, OF ST. LOUIS, MISSOURI.

BED-BOTTOM.

SPECIFICATION forming part of Reissued Letters Patent No. 10,749, dated July 27, 1886.

Original No. 327,611, dated October 6, 1885. Application for reissue filed December 12, 1885. Serial No. 185,500.

*To all whom it may concern:*

Be it known that I, DAVID F. STAMBAUGH, of the city of St. Louis, in the State of Missouri, have invented certain new and useful Improvements in Bed-Bottoms, of which the following is a specification, reference being had to the accompanying drawing, which is a detail top view of a bed embodying my invention.

My invention relates to certain improvements in spring bed-bottoms, and is designed, objectively, to produce a device that shall accommodate itself easily and quickly to every motion of the occupant, at the same time being simple, strong, and not liable to get out of order.

Referring to the drawing, A represents the sides (only one being shown) of the frame of the bed, and B the end pieces, the latter being preferably set at a slight angle to the horizontal, as shown.

C represents cross-pieces connecting the side pieces, A. At each end of the frame, secured to the pieces B, are a series of spiral springs, D, respectively sustaining the ends of the web of chains E, which are each composed of a series of links. These links are U-shaped, and have the bend or base indented, as shown at F, so that the links, when all secured together, will preserve their form, which tends toward the rectangular, giving thereby a large bearing-surface.

Between each two spirals D are links G, which are connected to the end pieces, B, and are loosely secured to the end links of the chains, so that the said spirals may have a restricted play, but not sufficient to distort or strain them. These links G act, as stated, to limit the stretch or expansion of the springs D and prevent them from being pulled out too far, which in time would be injurious to them.

The cross-pieces C each support a series of springs, H, on the tops of which rest the chains E, the said springs being connected to each other and to the chains by short links I. The chains of the web are held normally equidistant from each other by spirals K, which extend entirely across the said web. These cross-spirals allow the chains to yield readily to pressure and return them to their normal position as soon as the pressure is relieved.

Near each end of the side pieces, A, and fastened thereto, are spiral springs L, also connected to one of the springs H. These springs prevent any material side movement of the springs H, and thereby obviate any danger of their mashing over on one side.

It is evident that the bed-bottom will yield to pressure from any direction, and therefore be very comfortable to an occupant. The chains receive a mattress without pressing into it and support it perfectly. The links, though shown as rectangular or U shaped, may be of other forms.

The complete device is simple, lighter than slats, and cheaply and easily constructed.

The links I are shown in two different places. In one place they connect the springs together, and in another place they connect the chains to the springs, as shown.

I claim as my invention—

1. The combination of a frame having cross-pieces, spiral springs supported on the cross-pieces, web of chains E, consisting of links resting on the spiral springs and secured to the frame at each end, and links G, between the chains connected to the frame and loosely secured to the end links of the chains, substantially as described.

2. The combination of a frame having cross-pieces, spiral springs supported on the cross-pieces, web of chains E, consisting of links resting on the spiral springs and secured to the frame, short links connecting the spiral springs, and short links connecting the chains to the spiral springs, substantially as described.

3. The combination of a frame having cross-pieces, spiral springs supported on the cross-pieces, web of chains consisting of links resting on the spiral springs, springs connecting the chains to the frame, and links between the chains connected to the frame and loosely connected to the end links of the chains, substantially as described.

4. The combination of a frame, web of chains E, consisting of links, springs H, connecting the chains to the frame, and spirals K, extending across the web and holding the chains at equal distance from each other, substantially as described.

5. The combination of a frame, spiral springs resting on cross-pieces secured to the frame, web of chains flexibly connected to the frame

BEST AVAILABLE COPY and resting upon the springs, links connecting the springs together and to the chains, and coils connecting the chains together, substantially as set forth.

6. The combination of a frame having cross-pieces, spiral springs supported on the cross-pieces, spiral springs L, connecting cross-piece springs to the frame, and web of chains E, consisting of links resting on the cross-piece springs, substantially as described.

7. A spring bed-bottom consisting of a frame having cross-pieces supporting spiral springs, a web of flat-linked chains connected to the frame by spring-coils having a restricted play, the said chains resting on the spiral springs and connected one to the other by transverse coils, and coils connecting the spiral springs to the frame, the several parts being connected and operating substantially as and for the purpose set forth.

DAVID F. STAMBAUGH.

In presence of—
SAML. KNIGHT,
BENJN. A. KNIGHT.